Patented Apr. 14, 1925.

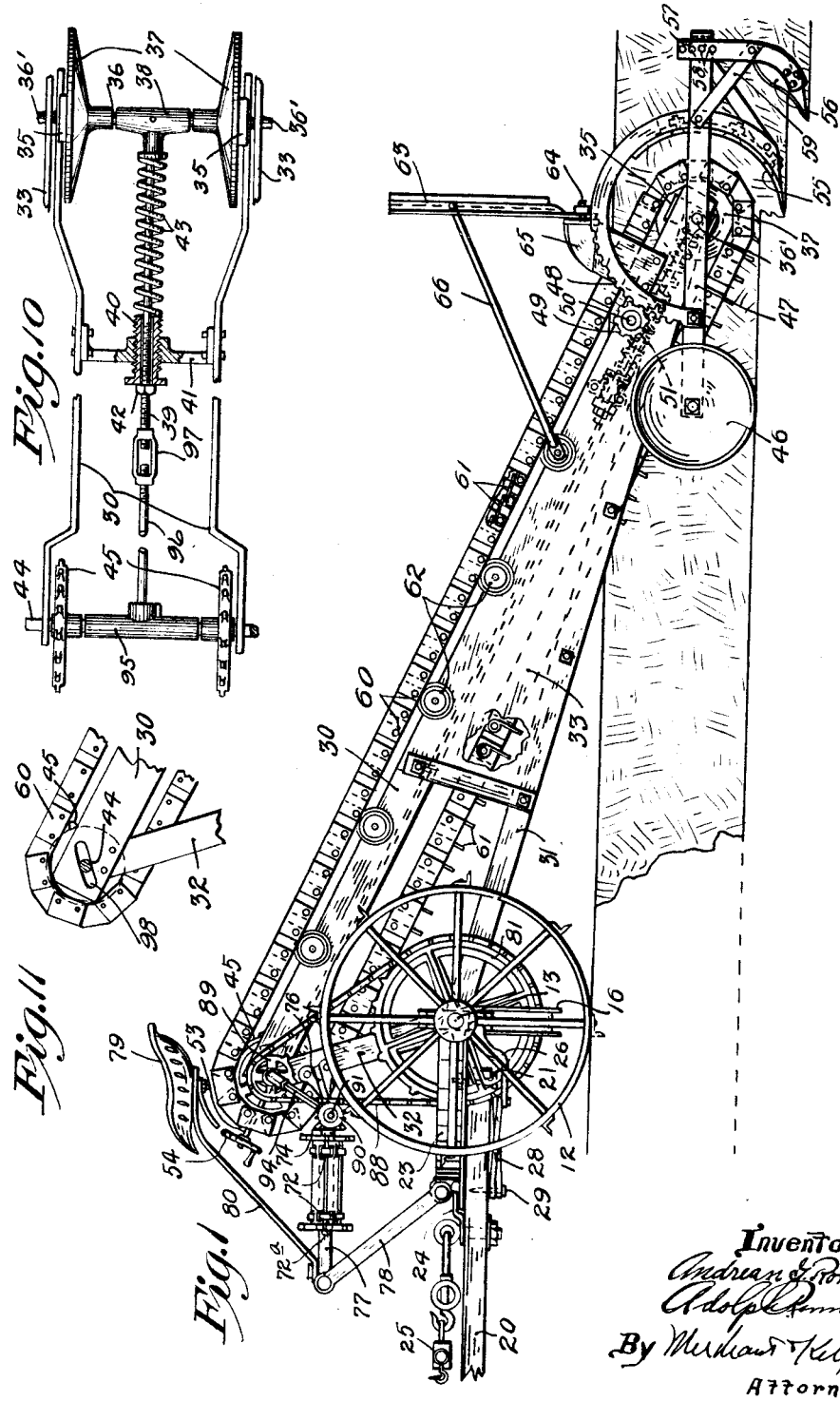

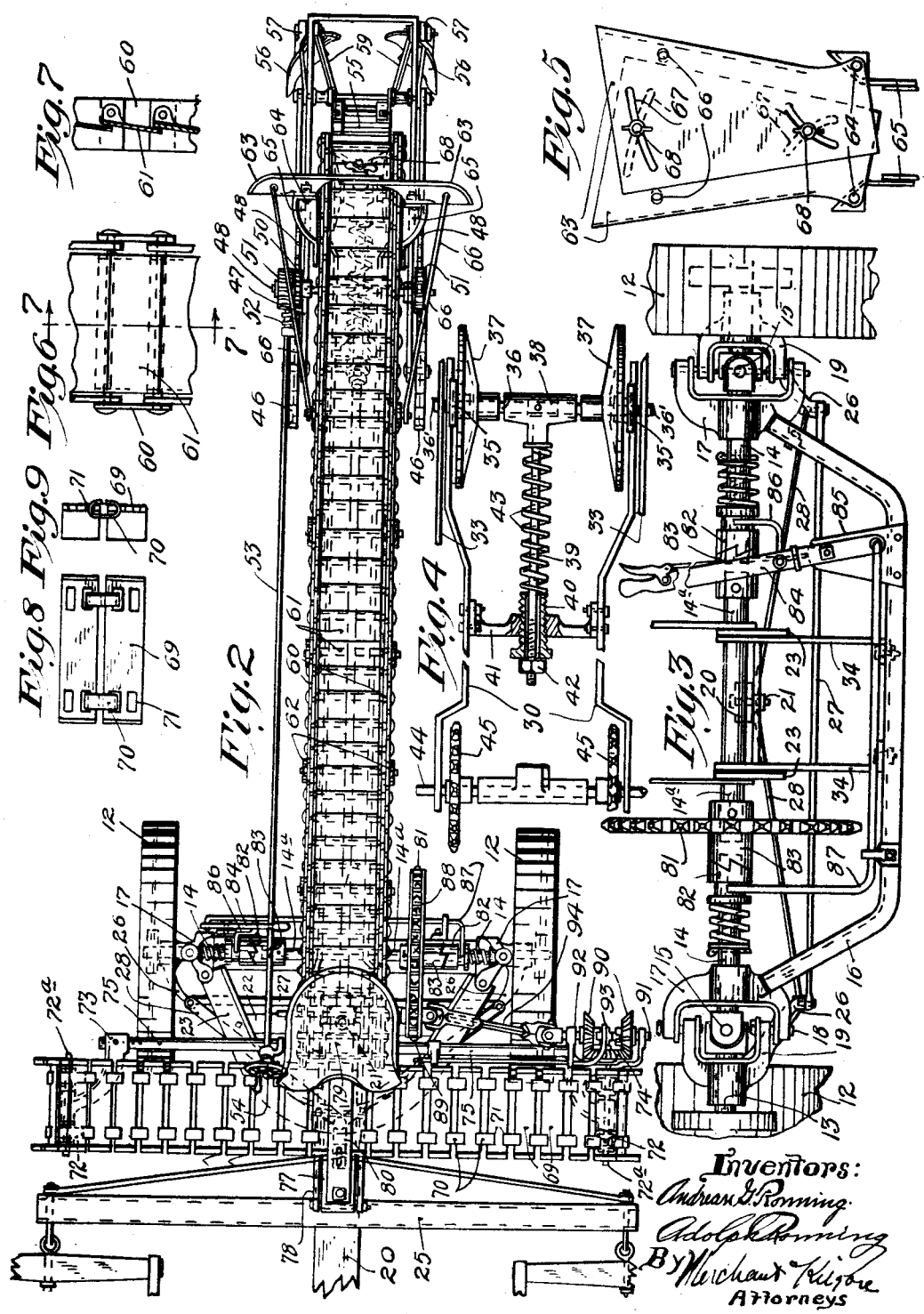

1,533,901

UNITED STATES PATENT OFFICE.

ANDREAN G. RONNING AND ADOLPH RONNING, OF MINNEAPOLIS, MINNESOTA.

DITCHER.

Application filed February 20, 1922. Serial No. 537,818.

*To all whom it may concern:*

Be it known that we, ANDREAN G. RONNING and ADOLPH RONNING, citizens of the United States, residing at Minneapolis, in the county of Hennepin and State of Minnesota, have invented certain new and useful Improvements in Ditchers; and we do hereby declare the following to be a full, clear, and exact description of the invention, such as will enable others skilled in the art to which it appertains to make and use the same.

Our present invention relates to excavators of the type generally designated as ditchers and which comprise a truck arranged to run upon the surface of the ground, and digging mechanism arranged to form the ditch and to drop into the ditch in the digging action. The ditcher may be drawn or propelled either by draft animals or by an engine. The excavating mechanism will, of course, be power-driven, but it may be power-driven either from traction wheels of the surface truck or by power from an engine.

The ditcher involves important novel features, certain of which will appear only in the following detailed description, as applied to the drawings, and certain of which features may be forecast by the following introductory statements.

On a long narrow frame supported at its front end by the surface truck, is mounted to travel a power-driven elevator belt that drops down into the ditch as the latter is being excavated by successive trips along the ditch area. The lower end of this narrow frame is supported by one or more wheels arranged to travel on the bottom of the ditch. The bottom of the ditch is excavated by a plow attached to the frame and arranged to deliver the plowed-up earth directly to the elevator belt. This plow is preferably curved so that it not only digs up the earth but holds the same subject to the elevator belt while it is being carried to the upper and forwardly moving part of the belt.

In ditchers of this general type, breakage of parts and other damage is frequently done by the jamming of large rocks between the plow and elevator belt, and which rocks are too large to pass in the space between the plow and belt. To obviate this trouble, it has hitherto, in some instances, been the practice to yieldingly mount the plow. Such an arrangement, if properly designed, may prevent breakage, but it must always be subject to this serious defect that the plow will be caused to yield and thrown out of operative position by all rearward pressure in excess of normal, such, for instance, as may be produced by extremely hard earth or the striking of the point of the plow against a rock which has not been forced between the plow and elevator belt but is simply imbedded in the earth.

As an important feature of our invention, we eliminate the above danger of breakage and are still able to use an unyielding plow which will always be forced to its work, by yieldingly mounting the lower rear or receiving portion of the elevator belt for forward movements away from the plow. With this arrangement, the yielding movement of the elevator belt will not be called into action by any resistance applied to the plow alone, but if a rock, too large to pass through the normal space between the plow and belt, is wedged or jammed between said plow and belt, the latter would simply be caused to move forward or away from the plow, thereby increasing the space and permitting the rock to pass with the earth to the top of the elevator belt.

With the above statements made, the ditcher, as illustrated in the drawings, will now be described.

Referring to the drawings, wherein like characters indicate like parts throughout the several views, Fig. 1 is a side elevation of the ditcher, showing the same in operation digging a ditch, some parts being broken away;

Fig. 2 is a plan view of the ditcher;

Fig. 3 is a fragmentary elevation showing the front axle structure and driving shaft of the surface truck, looking forward at the same;

Fig. 4 is a detail in plan showing the elevator frame, the elevator driving and guiding wheels and the yielding pressure device operative on the latter;

Fig. 5 is a rear elevation showing so-called reamer plates supported above the receiving portion of the elevator belt;

Fig. 6 is a plan view showing a fragment of the elevator belt;

Fig. 7 is a section on the line 7—7 of Fig. 6;

Fig. 8 is a plan showing a fragment of a transverse belt;

Fig. 9 is an edge elevation of the belt links shown in Fig. 8;

Fig. 10 is a view corresponding to Fig. 4 but illustrating a modified construction; and Fig. 11 is a fragmentary side elevation showing the manner in which the elevator frame illustrated in Fig. 10 is movably supported at its upper end.

Describing first the construction illustrated in Figs. 1 to 7, inclusive, and directing attention to the so-called surface truck, it will be noted that the same is provided with laterally spaced traction wheels 12 that are rigidly secured to the outer end sections 13 of an articulated axle shaft made up of said sections and a main intermediate section 14, which shaft sections are connected by universal joints 15. The front axle, as shown, is formed by a depressed axle beam 16, to the ends of which are rigidly secured bearing forks 17, which, by vertical pivots 18, are connected to steering forks 19, in which latter the outer shaft sections 13 are journaled. The universal joints 15 are aligned with the vertical pivots 18.

The truck here illustrated is arranged to be drawn by horses and has a pole 20, the rear end of which is pivoted at 21 to a cross bar 22 of a forwardly projecting yoke 23, which latter is attached to the fixed forks 17. The yoke 23 has a segmental portion that is concentric to the pivot 21 and is held to move vertically with the pole by a retaining plate 24 secured on the top of the pole. The numeral 25 indicates a four-horse evener or equalizer pivotally attached to the pole. This construction is not in itself a feature of my invention.

The oscillatory steering forks 19 have forwardly projecting arms 26 that are cross-connected by a tie-rod 27. Also, the two arms 26 are connected by rods 28 to a pin or bolt 29 applied to the pole forward of the pivot, so that the traction wheels 12 will be automatically oscillated by the pole oscillations and caused to follow the line of travel of the draft horses.

The long narrow elevator frame is made up chiefly of laterally spaced main bars 30, laterally spaced lower bars 31 and laterally spaced columns 32. At their rear ends, the bars 30 and 31 are brought together and are rigidly connected by side plates 33. The upper ends of the columns 32 are rigidly connected to the upper front ends of the main bars 30, while the lower ends of said columns and the front ends of the lower bars 31 are rigidly connected and pivoted to brackets 34 carried by the axle beam 16 (see Fig. 3). The pivotal connection between the triangular frame formed by the said members 30, 31, and 32, to the brackets 34 is co-incident with the axis of the axle shaft 14.

Mounted to slide on the lower ends of the frame bars 30 are shaft bearings 35 in which is secured a transverse shaft 36, (see particularly Fig. 4). Disk-like wheels 37 are journaled on the shaft 36 which terminates in the bearing 35 and, between said wheels, said shaft is rigidly secured to a head 38 having a stem 39 arranged to slide through a stop sleeve 40 having screw-threaded engagement with a cross bar 41 that connects the intermediate portions of the frame bars 30. The threaded end of the stem 39 is equipped with a stop nut 42. A strong coiled spring 43 is placed around the stem 39 and is compressed between the head 38 and sleeve 40. Journaled in the upper ends of the frame bars 30 is a transverse shaft 44 equipped with belt-driving sprockets 45 located between said bars.

The wheels 46 that carry the lower end of the elevator frame are journaled to the front ends of a U-shaped rocking frame 47 that is intermediately pivoted on studs 36' fixed to the side plates 33 and is provided with upstanding gear segments 48. The gear segments 48 mesh with pinions 49 on a cross shaft 50 that is journaled in suitable bearings on the elevator frame and provided at one end with a worm gear 51 that meshes with a worm 52 on the rear end of a long operating rod 53, (see Fig. 2). The rod 53 is mounted in suitable bearings on the side of one of the frame bars 30 and is provided with an operating wheel or hand piece 54 at its front end.

The rocking frame 47 operates as a lifting lever and also as a plow beam. The main plow 55 is rigidly connected to said frame 47 and, as shown, this is accomplished by extending the rear ends of the gear segments 48 and rigidly connecting the same to said plow. The plow 55 is not wider than the elevator belt and is concave and normally spaced from the receiving portion of the elevator belt substantially as shown in Fig. 1.

Laterally spaced, reversely beveled, auxiliary plows 56 are attached to the frame 47 at the rear of the main plow 55, are spaced so as to widen the furrow dug by the main plow and are positioned to work below the latter. As shown, the auxiliary plows 56 are rigidly secured to upstanding arms 57 having vertically spaced bolt holes adapting them to be rigidly but adjustably attached to the sides of said frame 47. Brace straps 59 also connect the arms 57 to the sides of the frame 47.

The elevator belt, as preferably designed, comprises laterally spaced sprocket chains or link belts 60 and overlapping blades 61. The blades 61 are pivoted to the links of the chains 60 and the end portions of certain of the blades, (see Fig. 6), co-operate with the chain links to complete the tooth-engaging links of said chains. These chains run over and are driven by the sprockets 45 on the shaft 44 and they also run over the disk-like lower wheels 37. Also, the upper runs of said chains run over idle guide wheels 62 on the sides of the elevator frame.

The excavating mechanism so far described will dig a ditch represented by the spacing of the auxiliary plows 56, but the width of the ditch may be increased or the upper portion of the ditch may be caused to flare by means of a pair of overlapped vertically and transversely disposed reaming plates 63, (see Figs. 1, 2 and 5). These reaming plates, at their lower outer corners, are pivoted at 64 to brackets 65, the lower ends of which are rigidly secured to the sides of the lower ends of the frame bars 30. The upper portions of the reaming plates 63 are attached to the rear ends of brace rods 66, the front ends of which are anchored at the sides of the elevator frame. The overlapping portions of the two reaming plates have intersecting slots 67 through which work nut-equipped clamping bolts 68.

Working in front of the delivery portion of the elevator belt 60—61 is a horizontally disposed endless discharge belt shown as made up of flat metal plates 69 and links 70, said plates 69 having slots 71 for engagement with sprockets 72 secured on shafts that are journaled in arms 73, one of said shafts 72ª being provided with a bevel gear 74, (see Figs. 1 and 2). The arms 73 are rigidly secured to the outer ends of a transverse torsion rod 75 mounted in suitable bearings 76 on the posts 32. At its central portion, the torsion rod 75 has a forwardly projecting arm 77, which, by a link 78, is connected to the yoke 23. The yoke 23, the arm 77, the link 78 and the posts 32, with their bearings 76, form a parallelogram with four pivot joints which support the discharge belt 69—70 always in horizontal position and cause the same to follow the adjustments of the elevator frame and belt and, hence, hold said discharge belt always in position to receive the dirt from the elevator belt and to discharge the same at one or the other side of the machine.

The numeral 79 indicates the operator's seat supported by a bar 80 from the front end of the arm 77 but adapted to be supported in any other suitable way.

In some instances, the main section 14 of the front axle shaft may be a single member, but to dispense with the differential gear, it is, in Fig. 3, shown as provided with a loose central section 14ª to which a sprocket 81 is rigidly secured. The divided outer sub-sections of the shaft 14 are provided with spring-pressed half-clutches 82 keyed to slide thereon and arranged to cooperate with half-clutches 83 fixed to the ends of the central section 14ª. With this arrangement, in going straight ahead, both traction wheels will drive, but either traction wheel may run ahead by the slipping of its half-clutch.

For simultaneously disengaging and rendering inoperative both half-clutches 82, we provide a lever 84 pivoted to a lug 85 on the axle beam 16 and operating relatively short and long shipper rods 86 and 87, the forked ends of which engage grooves of the co-operating half-clutches 82.

A sprocket chain 88 runs over the sprocket 81 and over a smaller sprocket 89 secured on one projecting end of the shaft 44; and thus, the elevator belt is driven from the traction wheels through the front axle shaft and clutches described.

The bevel gear 74 that drives the discharge belt is in constant mesh with a pair of reversely facing bevel gears 90, (see Fig. 2), that are reversely mounted on a short shaft 91 journaled in a bearing bracket 92 rigidly secured to one end of the torsion rod 75. Keyed to rotate with the shaft 91 is a double-ended clutch member 93 that is adapted to be slid into engagement with either of two half-clutches, one on each of the bevel gears 90, so as to thereby cause the discharge belt to be driven in either direction for delivery either at the right or left-hand side of the machine and ditch, at will. The sprocket 89 is connected to the shaft 91 by a knuckle-jointed telescopically extensible shaft 94, and thus, power is transmitted for driving the transverse discharge belt.

*Operation.*

Under the advance movement of the machine, the plows 55 and 56 will dig up the earth at the bottom of the ditch. The main plow 55 will not dig the full width of the ditch, but the auxiliary plows 56 form the sides of the ditch, dig deeper than the main plow and leave the earth somewhat loosened for the main plow on the next trip through the ditch. By manipulation of the rod 53 and connections described, the angularity of the rocking frame 47, in respect to the main or elevator frame, may be varied so as to set the plows for the proper depth of cut. For ordinary work, the frame 47 will be kept approximately horizontal, regardless of the depth of the furrow. Of course, the deeper the furrow, the greater will be the inclination of the elevator frame and elevator belt; and here it may be noted that adjustments of the frame 47 should be made for each successive trip through the ditch.

Under forward movement of the machine, both the elevator belt and the transverse discharge belt will be driven from the traction wheels and said belts will be driven in such direction that the earth will be carried on the upper portions of both belts. As the pivoted plates 33 of the elevator belt move upward in front of the main plow 55, they will be dropped back into overlapping positions, thereby closing the bottom of the belt and adapting it to carry the earth; but as said pivoted plates pass to the front and under portions of the upper sprockets 45, they discharge the dirt onto the transversely moving discharge belt and then immediately, under the action of gravity, drop into downturned positions, thereby insuring complete unloading or cleaning of the elevator belt, and avoid any congestion between the belt 60—61 and sprockets 37.

As already clearly indicated, if a rock should get lodged or wedged between the main plow 55 and the receiving portion of the elevator belt, the spring 43 will yield, permitting the receiving portion of the belt to move forward far enough to allow such rock to be carried upward with the dirt onto the elevator belt. In doing this, some slack will be given to the elevator belt, but such slack will be produced in the lower or returning and unloaded portion of the belt. Adjustments of the sleeve 40 vary the tension of the spring 43, while adjustments of the nut 42 limit the movement of the receivinging portion of the elevator belt toward the main plow and positively prevent the same from ever engaging said plow.

As the plows settle down or work their way into the ditch, the reaming plates 63 will come into action and, if set with their outer edges flaring, will give a flare to the upper walls of the ditch, thereby decreasing the tendency of the same to cave or wash in the ditch. Of course, if the ditch is dug to a considerable depth, the reaming plates will be brought into action to widen the ditch, giving the same parallel walls above the reaming plates.

From the many points of view noted and from others that are obvious, this improved ditcher is a highly efficient machine for the purposes had in view.

When the machine is to be hauled on the surface of the ground, the wheels 46 may be forced downward far enough to carry the plows above the surface of the ground and, hence, out of action, thereby using said wheels 46 only to carry the rear portion of the machine.

In the modified arrangement illustrated in Figs. 10 and 11, the shaft 44 that carries the sprockets 45 is journaled in a head 95 that is rigidly connected to the upper end of a rod 96, said rod being connected by a turnbuckle 97 to the threaded end of the rod or stem 39 of the lower head 38. Also, in this arrangement, the projecting ends of the shaft 44 work in slots 98 formed in the upper ends of the frame bars 30 on the arc of a circle struck from the common axis of the wheels 12. The spring 43 exerts a downward pressure on the rod 39—96 and tends to keep the same in its lowermost position.

With this modified arrangement, when the elevator belt is moved away from the plow by a rock caught between the plow and the receiving end of the belt, as already described, the entire elevator belt will move without changing the slack or tension of said belt and the slots 98 prevent change in tension of the sprocket chain 88.

What we claim is:

1. In an excavating machine, a forwardly inclined elevator boom, an endless carrier mounted upon shafts at opposite ends of the boom, a curved shovel arranged rearwardly of the lower end of the carrier and in normally uniform spaced relation therewith, said shovel being pivotally connected to the boom for swinging movement in a vertical plane, and means for mounting the lower shaft of the carrier with reference to the lower end of the carrier whereby the shaft will be yieldably movable away from the shovel to permit the space between the carrier and the shovel to enlarge under pressure.

2. In an excavating machine, a forwardly inclined elevator boom, a shaft mounted in the forward end of the boom, a second shaft mounted in the rearward end of the boom, means for mounting said second shaft including a spring adapted to yieldingly hold the shaft in a normally rearward position, a power driven endless conveyor carried by the said shafts, and a curved shovel spaced about the rear end of the carrier and co-operating therewith whereby dirt may be conveyed from the digging edge of the shovel to the upper run of the conveyor.

3. In an excavating machine, a forwardly elevator frame having an endless conveyor, a curved shovel arranged in spaced relation rearwardly of the lower end of the conveyor and arranged to co-operate therewith to dig and deliver dirt thereto, means for adjusting the shovel in a vertical plane and approximately on the arc of its curve, and means for mounting said shovel and lower end of the conveyor whereby the space therebetween may yieldingly enlarge when an object is forced thereinto.

4. The combination in an excavating machine, of a carriage adapted to travel on the surface of the ground, a forwardly inclined conveyor boom tiltably secured at its forward end to the carriage, a power operated endless carrier mounted longitudinally to the boom, a frame pivotally mounted to the lower end of the boom and adapted to support the same, means for manually adjusting the frame, a curved shovel rigidly secured to the frame and in spaced relation with the rear end of the carrier, and breaking tools rigidly secured to the frame whereby they will be adjustable thereby and simultaneously with the shovel.

5. In an excavator, the combination with a rearwardly extended elevator frame and a truck supporting the front end thereof, of an endless elevator belt, rotary guides for said belt at the front and rear ends of said frame, means for driving said belt, and a plow co-operating with the receiving portion of said elevator belt and having a support connecting the same to said frame for adjustment on the arc of a circle whose center is co-incident with the axis of the rear rotary belt guide.

6. In an excavator, the combination with a rearwardly extended elevator frame and truck supporting the front end thereof, of an endless elevator belt, rotary guides for said belt at the front and rear ends of the frame, means for driving said belt, a plow co-operating with the receiving portion of said elevator belt and having a support connecting the same to said frame for adjustments on the arc of a circle whose center is co-incident with the axis of the rear rotary belt guide, and laterally spaced breaking tools rigidly connected with said plow and arranged to cut beyond the sides and below the bottom of the latter.

7. In an excavator, the combination with a rearwardly extended elevator frame and a truck supporting the front end thereof, of an endless elevator belt, rotary guides for said belt at the front and rear ends of said frame, means for driving said belt, a rocking frame pivoted to the rear end of said elevator frame and provided with supporting wheels, means for angularly adjusting said rocking frame in respect to said elevator frame to thereby raise and lower the receiving portion of said elevator belt in respect to said supporting wheels, and a plow secured to the rear portion of said rocking frame and arranged to cut below said elevator belt and to deliver the earth directly thereto.

8. In an excavator, the combination with a rearwardly extended elevator frame and a truck supporting the front end thereof, of an endless elevator belt, rotary guides for said belt at the front and rear ends of said frame, means for driving said belt, a rocking frame pivoted to the rear end of said elevator frame and provided with supporting wheels, means for angularly adjusting said rocking frame in respect to said elevator frame to thereby raise and lower the receiving portion of said elevator belt in respect to said supporting wheels, a plow secured to the rear portion of said rocking frame and arranged to cut below said elevator belt and to deliver the earth directly thereto, and laterally spaced auxiliary plows secured to the rear portion of said rocking frame and arranged to cut beyond the sides and bottom of the first mentioned plow.

9. In an excavator, the combination with a rearwardly extended elevator frame and a carriage supporting the front end thereof, of an endless elevator belt, rotary guides for said belt at the front and rear ends of said frame, means for driving said belt, a plow arranged to cut below and deliver directly to the receiving portion of said elevator belt, and reaming plates carried by said elevator and arranged to work above said plow and receiving portion of said elevator belt.

10. In an excavator, the combination with a rearwardly extended elevator frame, and a carriage supporting the front end thereof, of an endless elevator belt, rotary guides for said belt at the front and rear ends of said frame, means for driving said belt, a plow arranged to cut below and deliver directly to the receiving portion of said elevator belt, and reaming plates carried by said elevator frame and arranged to work above said plow and receiving portion of said elevator belt, said reaming plates being pivoted at their lower ends and being angularly adjustable to vary the width of angle of the cut produced thereby.

11. In an excavator, a suitably mounted forwardly inclined elevator frame having a conveying mechanism, a shovel secured to the lower end of the elevator frame and spaced about the rear end of the conveying mechanism for co-operation therewith, and means for mounting the conveying mechanism in the elevator frame whereby the entire mechanism will be bodily movable away from the plow when subjected to a spreading pressure with respect thereto.

12. In an excavator, the combination with a rearwardly extended elevator frame and a truck supporting the front end thereof, of an endless elevator belt, rotary guides for said belt at the front and rear ends of said frame, means for driving said belt, a rocking frame pivoted to the rear end of said elevator frame and provided with supporting wheels, means for angularly adjusting said rocking frame in respect to said elevator frame to thereby raise and lower the receiving portion of said elevator belt in respect to said supporting wheels, said means for angularly adjusting said rocking frame including a toothed segment on said rocking frame, a shaft journaled to the lower portion of said elevator frame and having a pinion meshing with said toothed segment, and a worm and worm gear for rotating said shaft and locking the same in its different adjustments.

13. In an excavator, a plow and a co-operating elevator receiving directly therefrom, the receiving portion of said elevator being yieldingly held for normal co-operation with the plow but mounted to yield and move away from the plow under excessive pressure, and reaming plates arranged to work above said plow and the receiving portion of said elevator.

14. In an excavator, the combination with an elevator belt and excavating means at the receiving end thereof, of a transverse torsion rod mounted at the delivery end of said elevator belt, bearings secured to the ends of said torsion rod, rotary belt supports mounted on said bearings, a transversely movable belt running over said rotary belt supports, and means for driving said transverse discharge belt.

15. In an excavator, the combination with an elevator belt and excavating means at the receiving end thereof, of a transverse torsion rod mounted at the delivery end of said elevator belt, bearings secured to the ends of said torsion rod, rotary belt supports mounted on said bearings, a transversely movable discharge belt running over said rotary belt supports, and means for driving said transverse discharge belt, said last mentioned belt driving means including a motion reversing device whereby said discharge belt may be driven for delivery at either side of the machine.

16. In an excavator the combination with an elevator belt and excavating means at the receiving end thereof, of a transverse torsion rod mounted at the delivery end of said elevator belt, bearings secured to the ends of said torsion rod, rotary belt supports mounted on said bearings, a transversely movable discharge belt running over said rotary belt supports, and means for driving said transverse discharge belt, said elevator belt being angularly adjustable in a vertical plane, and means for maintaining said discharge belt constantly in a horizontal position regardless of angular adjustments of said elevator belt.

17. In an excavator, the combination with a front truck, of a rearwardly extended elevator frame mounted for angular adjustments of said front truck, said front truck having a forwardly projecting pole, a plow at the receiving end of said elevator frame for delivery of the earth to the receiving portion of said elevator belt, a transversely arranged torsion rod supported at the front portion of said elevator frame and provided at its ends with arms, rotary belt supports mounted on said arms, an arm secured in respect to said torsion rod and projecting forwardly therefrom, and a link connecting said forwardly projecting arm to a support on the pole structure, and a power driven transversely movable discharge belt mounted on the rotary supports carried by said first mentioned arms, said supports for said discharge belt forming an adjustable parallelogram which maintains said discharge belt in a horizontal position regardless of vertical angular adjustments of said elevator frame.

18. In an excavating machine, a forwardly inclined elevator frame having an endless conveyor, a shovel arranged in spaced relation rearwardly of the lower end of the conveyor and arranged for normal cooperation therewith to dig and deliver dirt thereto, and means for mounting said shovel and lower end of the conveyor whereby they may yield substantially horizontally with respect to each other when an object is forced therebetween.

In testimony whereof we affix our signature.

ANDREAN G. RONNING.
ADOLPH RONNING.